United States Patent
Wu et al.

(10) Patent No.: US 11,145,082 B2
(45) Date of Patent: Oct. 12, 2021

(54) METHOD FOR MEASURING ANTENNA DOWNTILT ANGLE BASED ON DEEP INSTANCE SEGMENTATION NETWORK

(71) Applicant: Wuyi University, Jiangmen (CN)

(72) Inventors: Yueting Wu, Jiangmen (CN); Yikui Zhai, Jiangmen (CN); Yu Zheng, Jiangmen (CN); Jihua Zhou, Jiangmen (CN); Tianlei Wang, Jiangmen (CN); Ying Xu, Jiangmen (CN); Junying Gan, Jiangmen (CN); Wenbo Deng, Jiangmen (CN); Qirui Ke, Jiangmen (CN)

(73) Assignee: Wuyi University, Jiangmen (CN)

( * ) Notice: Subject to any disclaimer, the term of this patent is extended or adjusted under 35 U.S.C. 154(b) by 0 days.

(21) Appl. No.: 16/966,604

(22) PCT Filed: Mar. 1, 2019

(86) PCT No.: PCT/CN2019/076719
§ 371 (c)(1),
(2) Date: Jul. 31, 2020

(87) PCT Pub. No.: WO2020/093631
PCT Pub. Date: May 14, 2020

(65) Prior Publication Data
US 2021/0056722 A1    Feb. 25, 2021

(30) Foreign Application Priority Data

Nov. 6, 2018 (CN) .......................... 201811317915.X

(51) Int. Cl.
*G06T 7/73* (2017.01)
*H04W 16/28* (2009.01)
(Continued)

(52) U.S. Cl.
CPC ............... *G06T 7/73* (2017.01); *G06N 20/00* (2019.01); *G06T 7/11* (2017.01); *G06T 7/194* (2017.01);
(Continued)

(58) Field of Classification Search
CPC ...... G06N 20/00; G06N 3/0454; G06N 3/084; G06T 2207/10016; G06T 2207/10032;
(Continued)

(56) References Cited

U.S. PATENT DOCUMENTS 10,866,302 B2 * 12/2020 Wu ..................... G01S 5/0289
2005/0272470 A1 * 12/2005 Hurler .................... H01Q 1/246
455/557

(Continued)

*Primary Examiner* — Bobbak Safaipour

(57) ABSTRACT

A method for measuring an antenna downtilt angle based on a deep instance segmentation network is disclosed, including: shooting an omni-directional antenna video using a drone; and transmitting the antenna video to a server in real time, and the server measuring an antenna downtilt angle in real time using a deep learning algorithm, the deep learning algorithm includes: a feature extraction network module for acquiring an antenna feature image; an instance segmentation module for binary segmentation of an antenna image and the background to distinguish antenna image pixels from background pixels; an antenna candidate box module for identifying and detecting the antenna image, acquiring an antenna candidate box and determining an antenna calibration box therefrom; and an antenna downtilt angle measuring module for measuring an antenna downtilt angle.

8 Claims, 4 Drawing Sheets

(51) Int. Cl.
  *G06T 7/194* (2017.01)
  *G06T 7/11* (2017.01)
  *G06N 20/00* (2019.01)

(52) U.S. Cl.
  CPC ... *H04W 16/28* (2013.01); *G06T 2207/10016* (2013.01); *G06T 2207/10032* (2013.01); *G06T 2207/20081* (2013.01)

(58) Field of Classification Search
  CPC . G06T 2207/20081; G06T 2207/20084; G06T 7/11; G06T 7/194; G06T 7/70; G06T 7/73; H04W 16/28; G01C 1/00; G01C 11/04
  See application file for complete search history.

(56) References Cited

U.S. PATENT DOCUMENTS

| | | | |
|---|---|---|---|
| 2016/0255471 A1* | 9/2016 | Marri Sridhar | H04W 56/006 455/456.2 |
| 2016/0255604 A1* | 9/2016 | Venkatraman | H04W 64/00 455/456.1 |
| 2018/0276841 A1* | 9/2018 | Krishnaswamy | G06K 9/00671 |
| 2020/0025877 A1* | 1/2020 | Sarkis | G01S 13/87 |
| 2020/0410710 A1* | 12/2020 | Deng | G06T 7/11 |
| 2021/0049782 A1* | 2/2021 | Zhai | G06K 9/00637 |
| 2021/0097344 A1* | 4/2021 | Goldstein | G06K 9/6262 |
| 2021/0142519 A1* | 5/2021 | Zhai | G06T 7/11 |
| 2021/0215481 A1* | 7/2021 | Zhai | G06N 3/0454 |

* cited by examiner

METHOD FOR MEASURING ANTENNA DOWNTILT ANGLE BASED ON DEEP INSTANCE SEGMENTATION NETWORK

CROSS REFERENCE TO RELATED APPLICATIONS

This application is a national stage application under 35 U.S.C. 371 of PCT Application No. PCT/CN2019/076719, filed on 1 Mar. 2019, which PCT application claimed the benefit of Chinese Patent Application No. 201811317915X filed on 6 Nov. 2018, the entire disclosure of each of which are hereby incorporated herein by reference.

TECHNICAL FIELD

The present disclosure relates to the field of communication measurement, and in particular, to a method for measuring an antenna downtilt angle based on a deep instance segmentation network.

BACKGROUND

An antenna downtilt angle often needs to be adjusted in the field of communications. The antenna downtilt angle is one of the important parameters to determine the coverage of base station signals. It is not only necessary to accurately design a downtilt angle of each antenna at the initial stage of network planning, but also necessary to accurately adjust the downtilt angle after a base station is put into operation with the development of services, changes of users and changes of an ambient signal environment.

At present, a mechanical downtilt angle of a base station antenna is generally measured by a gradiometer. When measuring the mechanical downtilt angle of the antenna with the gradiometer, a surveyor must climb an iron tower or hold a pole close to the antenna for measurement, which is quite dangerous and troublesome, and also affects the accuracy of measurement. With the technological development, a GSM-R system emerges. The system is a measuring system tool with which a surveyor can accurately measure an antenna downtilt angle without getting close to an antenna, which can realize the measurement of a tilt angle of a base station antenna without a tower climbing operation, and can network test points of each base station to realize the real-time monitoring of the downtilt angle of the base station antenna. However, the installation of a sensor is time-consuming and costly, and there are differences in old and new towers and the number of layers and the number of base station towers, so the method is not practical, has a long operation cycle, and is difficult to implement. Therefore, it is necessary to design an angle measuring method with simple operations and reliable performance.

SUMMARY

To solve the above problems, the embodiments of the present disclosure aim at providing an antenna downtilt angle measuring method based on a deep instance segmentation network, so as to measure an antenna downtilt angle safely, effectively, quickly and accurately.

The technical scheme adopted by the embodiments of the present disclosure to solve the problems is as follows:

An antenna downtilt angle measuring method based on a deep instance segmentation network, comprising: shooting an omni-directional antenna video using a drone; and transmitting the antenna video to a server in real time, and the server measuring an antenna downtilt angle in real time using a deep learning algorithm wherein the deep learning algorithm comprises: a feature extraction network module for acquiring an antenna feature image; an instance segmentation module for binary segmentation of an antenna image and the background to distinguish antenna image pixels from background pixels; an antenna candidate box module for identifying and detecting the antenna image, acquiring an antenna candidate box and determining an antenna calibration box therefrom; and an antenna downtilt angle measuring module for measuring an antenna downtilt angle; and the instance segmentation module comprises: directly mapping a region of interest to a feature map; segmenting a candidate region into k*k cells, determining, for each cell, four fixed coordinate positions of the center point of the cell, and calculating values of the four fixed coordinate positions by bilinear interpolation; and performing max-pooling and implementing back propagation.

Further, the shooting an omni-directional antenna video using a drone comprises: controlling the drone to fly around in a circle with an antenna as the origin and a radius of r meters from the antenna at a height of h meters from the antenna, and shooting a 360-degree omni-directional antenna video.

Further, the feature extraction network module comprises a residual network for solving gradient problems and network performance degradation problems and a feature pyramid network for solving multi-scale detection problems.

Further, a back propagation formula of the instance segmentation module is $$\frac{\partial L}{\partial x_i} = \sum_r \sum_j [d(i, i*(rj)) < 1](1 - \Delta h)(1 - \Delta w)\frac{\partial L}{\partial y_{rj}};$$

wherein xi represents a pixel point on the feature map before max-pooling; yrj represents the jth point in the rth candidate region after max-pooling; i*(r, j) represents coordinates of the pixel point before max-pooling corresponding to a pixel value of the point yrj; xi*(r, j) represents coordinates of sampling points calculated during back propagation, d(•) denotes a distance between two points, and Δh and Δw denote differences of horizontal and vertical coordinates of xi and xi*(r, j).

Preferably, the antenna candidate box module is a candidate box selection module of a faster RCNN network structure.

Further, a target loss function of the antenna candidate box module is $$L(\{p_i\}, \{t_i\}) = \frac{1}{N_{cls}}\sum_i L_{cls}(p_i, p_i^*) + \lambda \frac{1}{N_{reg}}\sum_i p_i^* L_{reg}(t_i, t_i^*);$$

wherein Lcls is a classification loss function, and its expression is: $L_{cls}(p_i, p_i^*) = -\log[p_i^* p_i + (1-p_i^*)(1-p_i)]$, Lreg is a regression loss function, and its expression: $L_{reg}(t_i, t_i^*) = R(t_i - t_i^*)$; and an R function is defined as $$\text{Smooth } L_1(x) = \begin{cases} 0.5x^2 & \text{if } |x| < 1 \\ |x| - 0.5 & \text{otherwise} \end{cases}.$$

Further, the antenna downtilt angle measuring module obtains a region with a minimum relative proportion by comparing a relative proportion between the antenna calibration box and a region represented by the antenna image pixels.

Preferably, the antenna downtilt angle measuring module measures the antenna downtilt angle based on the following formula:

$$0 = \arctan\frac{x}{y},$$

wherein x is the width of the calibration box, and y is the length of the calibration box.

The embodiments of the present disclosure have the following beneficial effects: the embodiments of the present disclosure adopt an antenna downtilt angle measuring method based on a deep instance segmentation network, in which an antenna image to be measured is inputted into a deep learning network and is sequentially processed by a feature network module, an instance segmentation module, an antenna candidate box module and an antenna downtilt angle measuring module to output an antenna downtilt angle. Meanwhile, the instance segmentation network achieves binary segmentation of antenna pixels and background pixels, which makes the subsequent antenna candidate region more simple and accurate, so that the measured antenna downtilt angle is more consistent with an actual value. According to the embodiments of the present disclosure, the danger of climbing measurement is avoided and the cost of installing the sensor is reduced, and data of the antenna downtilt angle can be obtained more effectively, safely, cheaply and accurately.

BRIEF DESCRIPTION OF THE DRAWINGS

The present disclosure is further described below with reference to the accompanying drawings and examples.

DETAILED DESCRIPTION

Figure 1:
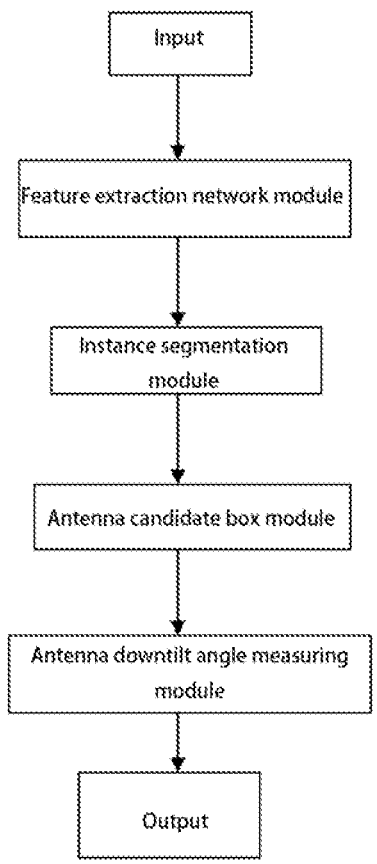
FIG. 1 is a network structure diagram of a deep learning algorithm according to an embodiment of the present disclosure.

Referring to FIG. 1, an antenna downtilt angle measuring method based on a deep instance segmentation network is disclosed in an embodiment of the present disclosure, including: shooting an omni-directional antenna video using a drone; and transmitting the antenna video to a server in real time, and the server measuring an antenna downtilt angle in real time using a deep learning algorithm, wherein the deep learning algorithm includes: a feature extraction network module for acquiring an antenna feature image; an instance segmentation module for binary segmentation of an antenna image and the background to distinguish antenna image pixels from background pixels; an antenna candidate box module for identifying and detecting the antenna image, acquiring an antenna candidate box and determining an antenna calibration box therefrom; and an antenna downtilt angle measuring module for measuring an antenna downtilt angle.

In an embodiment, the shooting an omni-directional antenna video using a drone includes: controlling the drone to fly around in a circle with an antenna as the origin and a radius of r meters from the antenna at a height of h meters from the antenna, and shooting a 360-degree omni-directional antenna video, wherein h is 10, and r is 10.

In an embodiment, the feature extraction network module includes a residual network for solving gradient problems and network performance degradation problems and a feature pyramid network for solving multi-scale detection problems.

Figure 2:
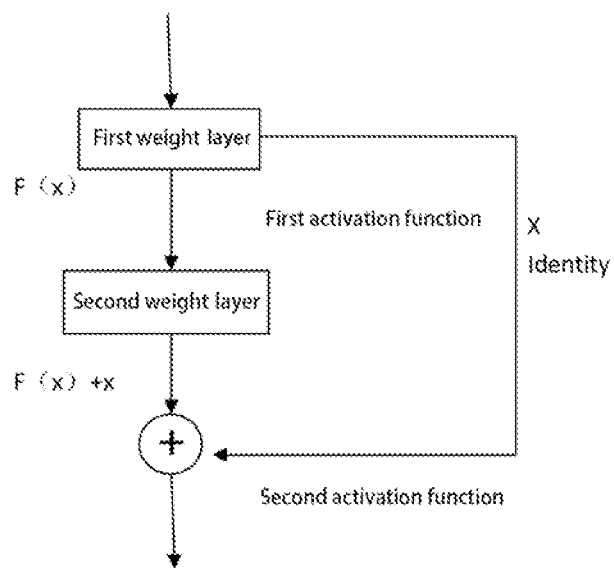
FIG. 2 is a structural diagram of a residual network of a feature extraction network module according to an embodiment of the present disclosure.

Referring to FIG. 2, in a deep learning network, the "level" of features will increase as the depth of the deep learning network deepens, so the depth of the deep learning network is an important factor to achieve a good feature extraction effect. However, the gradual deepening of the network depth will be accompanied by gradient disappearance and gradient explosion and other problems. The conventional solution is to initialize and regularize data, which solves the gradient problems but leads to problems of performance degradation and an increased error rate of the deep learning network. The use of the residual network can solve the gradient problems as well as the problem of performance degradation of the deep learning network.

Figure 3:
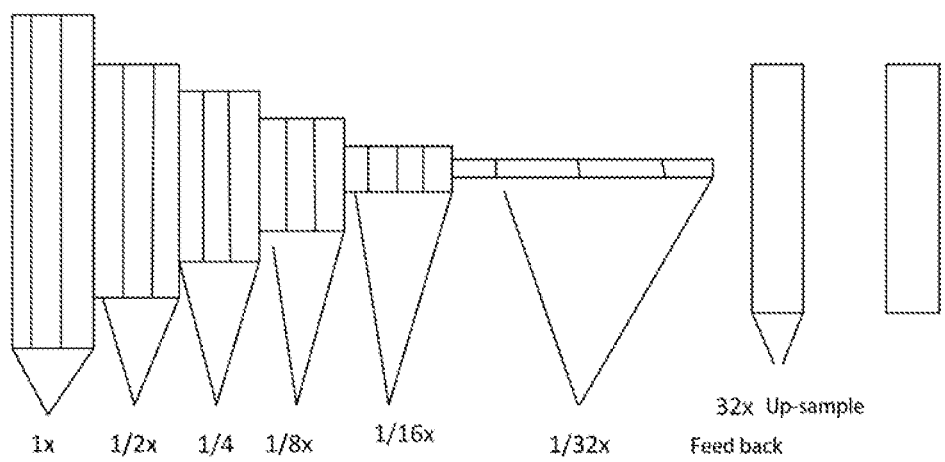
FIG. 3 is a structural diagram of a feature pyramid network of a feature extraction network module according to an embodiment of the present disclosure.

Referring to FIG. 3, the feature pyramid network is designed with a top-down and horizontally connected structure to combine a shallow layer with high resolution and a deep layer with rich semantic information. The top-down structure first samples an antenna feature map in a deeper layer with stronger semantics, and then connects the sampled antenna feature horizontally to a feature layer in the previous layer, thus reinforcing the antenna feature in the higher layer. The feature pyramid network can quickly construct a feature pyramid with strong semantic information at all scales from a single-scale input antenna image without a significant cost. With simple network connection changes, the performance of antenna object detection is greatly improved without increasing the calculation amount of the original model.

Figure 4:
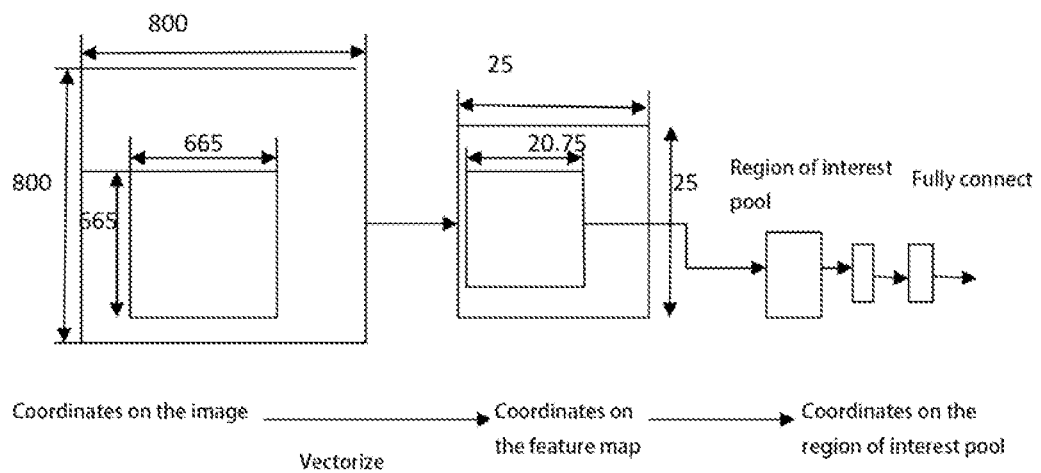
FIG. 4 is a schematic flowchart of an instance segmentation module according to an embodiment of the present disclosure.

Referring to FIG. 4, in an embodiment, the instance segmentation module includes: directly mapping a region of interest to a feature map; segmenting a candidate region into k*k cells, determining, for each cell, four fixed coordinate positions of the center point of the cell, and calculating values of the four fixed coordinate positions by bilinear interpolation; and performing max-pooling and implementing back propagation.

a back propagation formula of the instance segmentation module is $$\frac{\partial L}{\partial x_i} = \sum_r \sum_j [d(i, i*(rj)) < 1](1 - \Delta h)(1 - \Delta w)\frac{\partial L}{\partial y_{rj}};$$

wherein xi represents a pixel point on the feature map before max-pooling; yrj represents the jth point in the rth candidate region after max-pooling; i*(r, j) represents coordinates of the pixel point before max-pooling corresponding to a pixel value of the point yrj; xi*(r, j) represents coordinates of sampling points calculated during back propagation, d(•) denotes a distance between two points, and Δh and Δw denote differences of horizontal and vertical coordinates of xi and xi*(r, j), which are multiplied by the original gradient as a bilinear interpolation coefficient. In the antenna feature map before max-pooling, each point and the horizontal and vertical coordinates of xi*(r, j) which are less than 1 will receive a gradient returned by the point yrj corresponding thereto.

Figure 5:
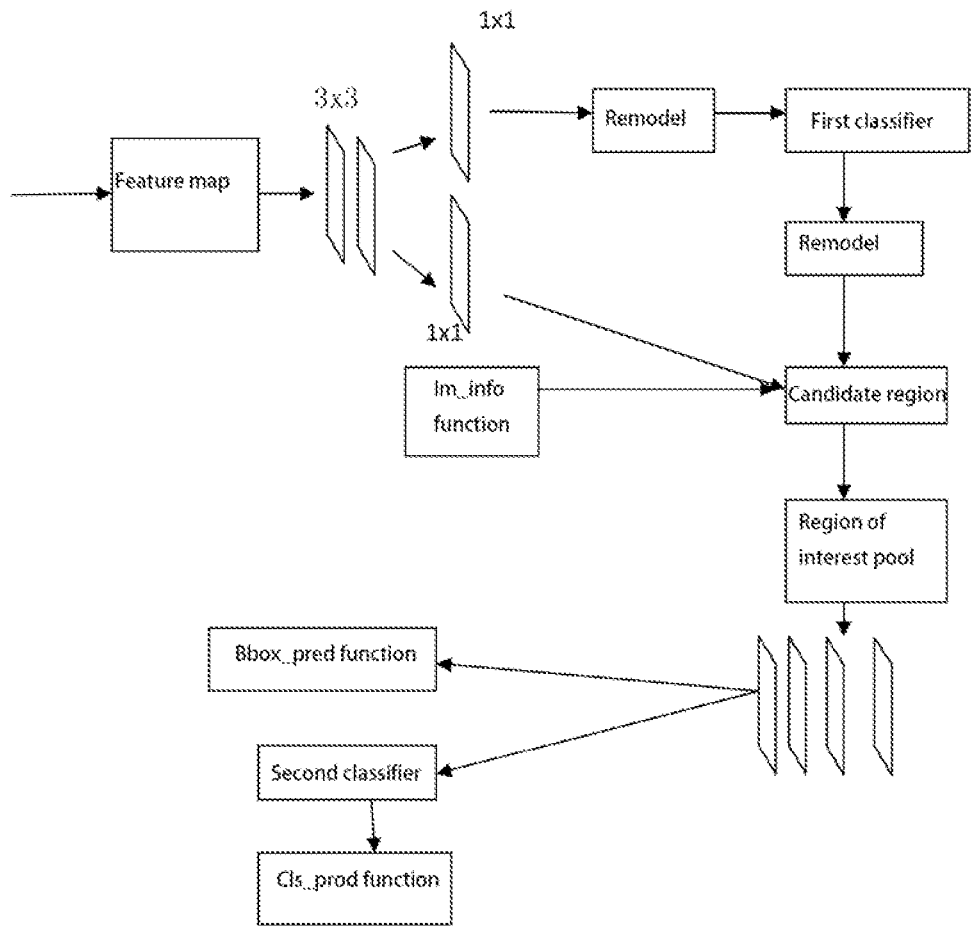
FIG. 5 is a structural diagram of an antenna candidate box module according to an embodiment of the present disclosure.

Referring to FIG. 5, in an embodiment, preferably, the antenna candidate box module is a candidate box selection module using a faster RCNN network structure.

Further, the antenna candidate box module finally classifies and regresses the selected candidate box, its target loss function is $$L(\{p_i\}, \{t_i\}) = \frac{1}{N_{cls}} \sum_i L_{cls}(p_i, p_i^*) + \lambda \frac{1}{N_{reg}} \sum_i p_i^* L_{reg}(t_i, t_i^*);$$

wherein Lcls is a classification loss function, and its expression is: $L_{cls}(p_i, p_i^*) = -\log[p_i^* p_i + (1-p_i^*)(1-p_i)]$; Lreg is a regression loss function, and its expression is: $L_{reg}(t_i, t_i^*) = R(t_i - t_i^*)$; and an R function is defined as $$\text{Smooth } L_1(x) = \begin{cases} 0.5x^2 & \text{if } |x| < 1 \\ |x| - 0.5 & \text{otherwise} \end{cases}.$$

Further, the antenna downtilt angle measuring module obtains a region with a minimum relative proportion by comparing a relative proportion between the antenna calibration box and a region represented by the antenna image pixels.

Preferably, the antenna downtilt angle measuring module measures the antenna downtilt angle based on the following formula:

$$\theta = \arctan \frac{x}{y},$$

where x is the width of the calibration box, and y is the length of the calibration box.

The above are merely preferred embodiments of the present disclosure, and the present disclosure is not limited to the above implementations. All implementations shall be encompassed in the protection scope of the present disclosure as long as they achieve the technical effect of the present disclosure with the same means.

The invention claimed is:

1. A method for measuring an antenna downtilt angle based on a deep instance segmentation network, comprising:
shooting an omni-directional antenna video using a drone; and
transmitting the antenna video to a server in real time, and the server measuring an antenna downtilt angle in real time using a deep learning algorithm,
wherein the deep learning algorithm comprises: a feature extraction network module for acquiring an antenna feature image; an instance segmentation module for binary segmentation of an antenna image and the background to distinguish antenna image pixels from background pixels; an antenna candidate box module for identifying and detecting the antenna image, acquiring an antenna candidate box and determining an antenna calibration box therefrom; and an antenna downtilt angle measuring module for measuring an antenna downtilt angle; and
the instance segmentation module comprises: directly mapping a region of interest to a feature map; segmenting a candidate region into k*k cells, determining, for each cell, four fixed coordinate positions of the center point of the cell, and calculating values of the four fixed coordinate positions using bilinear interpolation; and performing max-pooling and implementing back propagation.

2. The method for measuring an antenna downtilt angle based on a deep instance segmentation network according to claim 1, wherein the shooting an omni-directional antenna video using a drone comprises: controlling the drone to fly around in a circle with an antenna as the origin and a radius of r meters from the antenna at a height of h meters from the antenna, and shooting a 360-degree omni-directional antenna video.

3. The method for measuring an antenna downtilt angle based on a deep instance segmentation network according to claim 2, wherein the feature extraction network module comprises a residual network for solving gradient problems and network performance degradation problems and a feature pyramid network for solving multi-scale detection problems.

4. The method for measuring an antenna downtilt angle based on a deep instance segmentation network according to claim 1, wherein the back propagation formula of the instance segmentation module is $$\frac{\partial L}{\partial x_i} = \sum_r \sum_j [d(i, i*(rj)) < 1](1 - \Delta h)(1 - \Delta w) \frac{\partial L}{\partial y_{ri}};$$

wherein $x_i$ represents a pixel point on the feature map before max-pooling; $y_{rj}$ represents the $j^{th}$ point in the $r^{th}$ candidate region after max-pooling; i*(r, j) represents coordinates of the pixel point before max-pooling corresponding to a pixel value of the point $y_{rj}$; $x_i$*(r, f) represents coordinates of sampling points calculated during back propagation, d(•) denotes a distance between two points, and Δh and Δw denote differences of horizontal and vertical coordinates of $x_i$ and $x_i$*(r, j).

5. The method for measuring an antenna downtilt angle based on a deep instance segmentation network according to claim 1, wherein the antenna candidate box module is a candidate box selection module using a faster RCNN network structure.

6. The method for measuring an antenna downtilt angle based on a deep instance segmentation network according to claim 5, wherein the antenna candidate box module's target loss function is $$L(\{p_i\}, \{t_i\}) = \frac{1}{N_{cls}} \sum_i L_{cls}(p_i, p_i^*) + \lambda \frac{1}{N_{reg}} \sum_i p_i^* L_{reg}(t_i, t_i^*);$$

wherein $L_{cls}$ is a classification loss function, and its expression is:

$L_{cls}(p_i, p_i^*) = -\log[p_i^* p_i + (1-p_i^*)(1-p_i)]$;

$L_{reg}$ is a regression loss function, and its expression is:
$L_{reg}(t_i,t_i^*)=R(t_i-t_i^*)$; and
an R function is defined as $$\text{Smooth } L_1(x) = \begin{cases} 0.5x^2 & \text{if } |x| < 1 \\ |x| - 0.5 & \text{otherwise} \end{cases}.$$

7. The method for measuring an antenna downtilt angle based on a deep instance segmentation network according to claim 1, wherein the antenna downtilt angle measuring module obtains a region with a minimum relative proportion by comparing a relative proportion between the antenna calibration box and a region represented by the antenna image pixels.

8. The method for measuring an antenna downtilt angle based on a deep instance segmentation network according to claim 7, wherein the antenna downtilt angle measuring module measures the antenna downtilt angle based on the following formula:

$$0 = \arctan\frac{x}{y},$$

where x is the width of the calibration box, and y is the length of the calibration box.

* * * * *